Feb. 11, 1941.   A. A. QUIMPER   2,231,817
REFRIGERATION APPARATUS
Filed April 15, 1939   3 Sheets-Sheet 1

INVENTOR
ANTHONY A. QUIMPER.

Feb. 11, 1941.     A. A. QUIMPER     2,231,817
REFRIGERATION APPARATUS
Filed April 15, 1939     3 Sheets-Sheet 2

WITNESSES:

INVENTOR
ANTHONY A. QUIMPER
BY
ATTORNEY

Feb. 11, 1941.　　　A. A. QUIMPER　　　2,231,817
REFRIGERATION APPARATUS
Filed April 15, 1939　　　3 Sheets-Sheet 3

WITNESSES:
H.R.Heintzen
E.H.Lutz

INVENTOR
ANTHONY A. QUIMPER
BY
ATTORNEY

Patented Feb. 11, 1941

2,231,817

UNITED STATES PATENT OFFICE 2,231,817

REFRIGERATION APPARATUS

Anthony A. Quimper, Westfield, Mass., assignor to Westinghouse Electric & Manufacturing Company, East Pittsburgh, Pa., a corporation of Pennsylvania Application April 15, 1939, Serial No. 267,979

4 Claims. (Cl. 62—89)

This invention relates to refrigerating apparatus and more especially to a receptacle for storing fresh meats.

It is an object of the invention to provide a high humidity, low temperature meat storage receptacle of superior convenience and design.

Another object is to provide a meat storage receptacle, the container portion of which can be withdrawn independently of the cover portion and which, when partially withdrawn, is supported in position.

Still another object of the invention is to provide a meat storage receptacle, the component parts of which are readily formed from sheet metal to provide a smooth exterior which is easily cleaned and pleasing to the eye.

These and other objects are effected by my invention as will be apparent from the following description and claims taken in connection with the accompanying drawings, forming a part of this application, in which:

Figure 1:
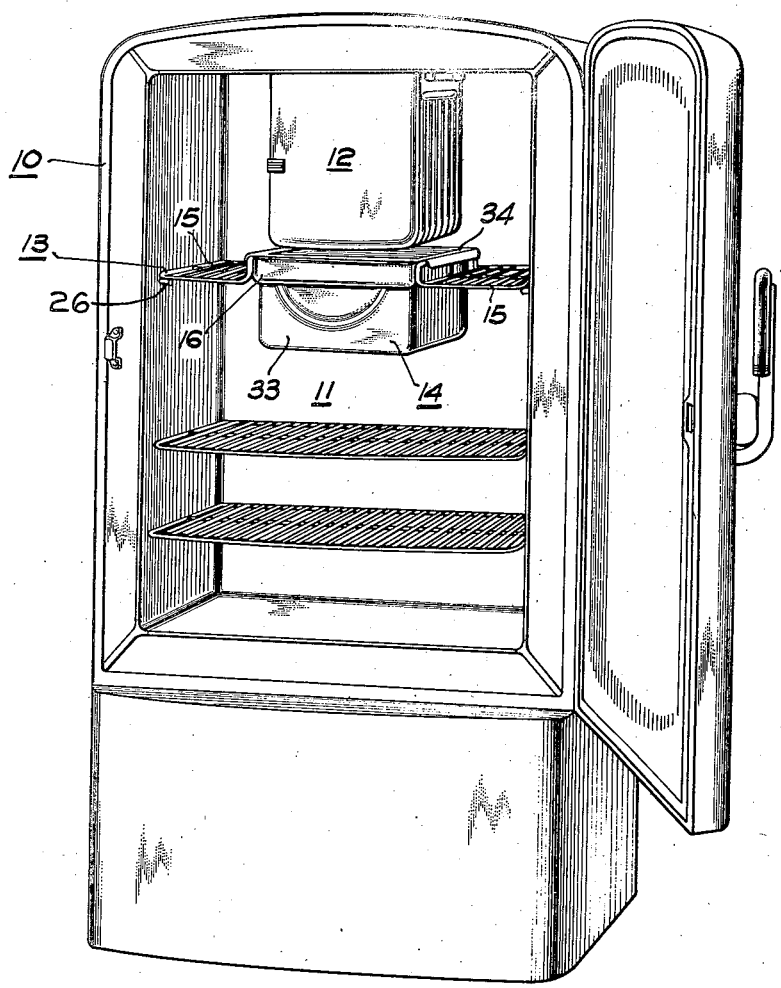
Fig. 1 is a view in perspective of the refrigerator and the food storage receptacle of this invention.

Referring now to the drawings for a detailed description of the invention, the reference numeral 10 designates a refrigerator cabinet having an insulated food storage chamber 11 in the upper portion thereof. An evaporative cooling unit 12 of well-known design is secured in the food storage chamber 11 to the upper wall thereof. The cooling unit 12 is supplied with liquid refrigerant from a mechanical refrigerating unit (not shown) in the lower portion of the cabinet. A series of shelves are arranged in the food storage chamber 11 below the cooling unit, the upper shelf 13 of which supports the food storage receptacle 14 of this invention immediately below the cooling unit 12.

The shelf 13 comprises supporting surfaces 15 at each end and an open central section 16 wherein the receptacle 14 is supported. The shelf is constructed largely of rods welded to one another and provided with a protective coating of tin. The structural members of the shelf comprise a straight rear rod 17 reinforced by a U-shaped rod 18 welded at its extremities to the front surface of the rear rod 17. Two generally U-shaped rods 19 are also welded to the front surface of the rear rod 17, each of the rods 19 forming the front edges 21 and side edges 22 of the respective supporting surfaces 15. The portions of the rods 19 adjacent the central open section 16 of the shelf are bent upwardly to form two parallel and elevated supporting rails 23 for the receptacle 14. A central reinforcing rod 24 is also provided for each shelf portion 15, which rod 24 is secured at one end to the lower surface and centrally of the supporting rail 23, and at its other end to the inner surface of the rod 19 forming the side edge 22 of the shelf 13. The supporting surfaces 15 of the two end portions of the shelf are each formed by U-shaped wires 25 welded at the rear of the shelf 13 to the rod 17, at the center to the reinforcing rod 24, and at the front of the shelf 13 to the front edge 21 of the shelf 13.

The shelf 13 is supported in the refrigerator by four pins 26 and 27 secured in the side walls of the storage chamber 11, which pins engage the side edges 22 of the shelf 13. The side edges 22 of the shelf 13 are each provided with an angle piece 29, which angle pieces bear respectively against the rear surfaces of the forward pins 26 in the side walls of the insulated chamber 11 to prevent the shelf 13 from moving forward when the receptacle 14 is pulled out. Each of the side edges 22 of the shelf 13 are also provided with a hook member 31 which hook members underlie respectively the rear pins 27 in the side walls of the insulated chamber 11 to prevent the shelf 13 from tilting when the receptacle 14 is left in a partially pulled-out position.

The receptacle 14 comprises a deep pan 33 and a cover 34 therefor. The pan 33 is provided with outwardly-turned flanges at the front and sides, the side flanges 35 engaging the supporting rails 23 to support the pan 33 thereon. The rear wall of the pan 33 is also provided with a flange 36 but at a lower level than the side flanges 35. The front surface of the pan 33 is dished inwardly and provided with an overlying handle portion 37 by means of which the receptacle 14 may be pulled forwardly on the supporting rails 23. A ventilating opening 38 is formed in each side of the pan 33.

Within the pan 33 is a rack 41 composed of a wire bent into the form of a rectangular frame 42 and a series of parallel and spaced-apart wires 43 welded upon this frame 42 to form the supporting platform of the rack 41. Portions of the frame 42 are bent downwardly to form supports or legs 44 which elevate the frame 42 above the bottom of the pan 33. This rack 41 supports the meat and other food articles placed thereon above the bottom of the pan 33 so that air can reach all surfaces of these articles.

A strip of sheet metal 46 formed into a somewhat irregular L section is secured at its lower portion 47 to each of the supporting rails 23 at their respective outer surfaces. The strips have horizontal portions 48 which overlie the side flanges 35 of the pan 33 and prevent the tilting of the pan 33 when it is partially pulled from the supporting rails 23. These portions 48 also form slide rails for the cover 34. The horizontal portions 48 each have a downwardly-bent lug 52 at the rear end thereof which engages the respective sidewardly-extending flanges 35 on the pan and limits the rearward travel of the pan 33.

The cover 34 comprises a depressed portion in its center which forms a storage basin 53 for incidental moisture dripping from the cooling unit 12. The cover 34 has downwardly-turned flanges 54 at its sides which cover the strip 46 and the supporting rails 23 of the shelf 13.

The metal strips 46 each have a sidewardly-extending lug 55 at the rear end which lugs engage the respective downwardly-turned flanges 54 of the cover 34 and limit its rearward travel. The pan 33 and its cover 34 are coated with vitreous enamel.

The function of the above-described structure is as follows: The shelf 13 which supports the food receptacle 14 is spaced from the top of the refrigerator at an elevation to provide room for milk bottles and other tall bottles which may thereby be stored in an upright position in the cold area adjacent the cooling unit 12. The top of the meat storage receptacle 14 is elevated above the surface of the shelf 13 to be near the cooling unit 12 so as to provide maximum cooling effect for the receptacle 14 so that it is suitable for the storage of fresh cuts of meat. Such cuts of meat are preferably stored at a temperature near, but at all times above the freezing temperature of the meat. The cover 34 of the meat receptacle 14 protects the meat from the downwardly flowing convectional air current descending from the cooling unit 12 which air stream is very dry and would dehydrate the surface of the meat.

Figure 2:
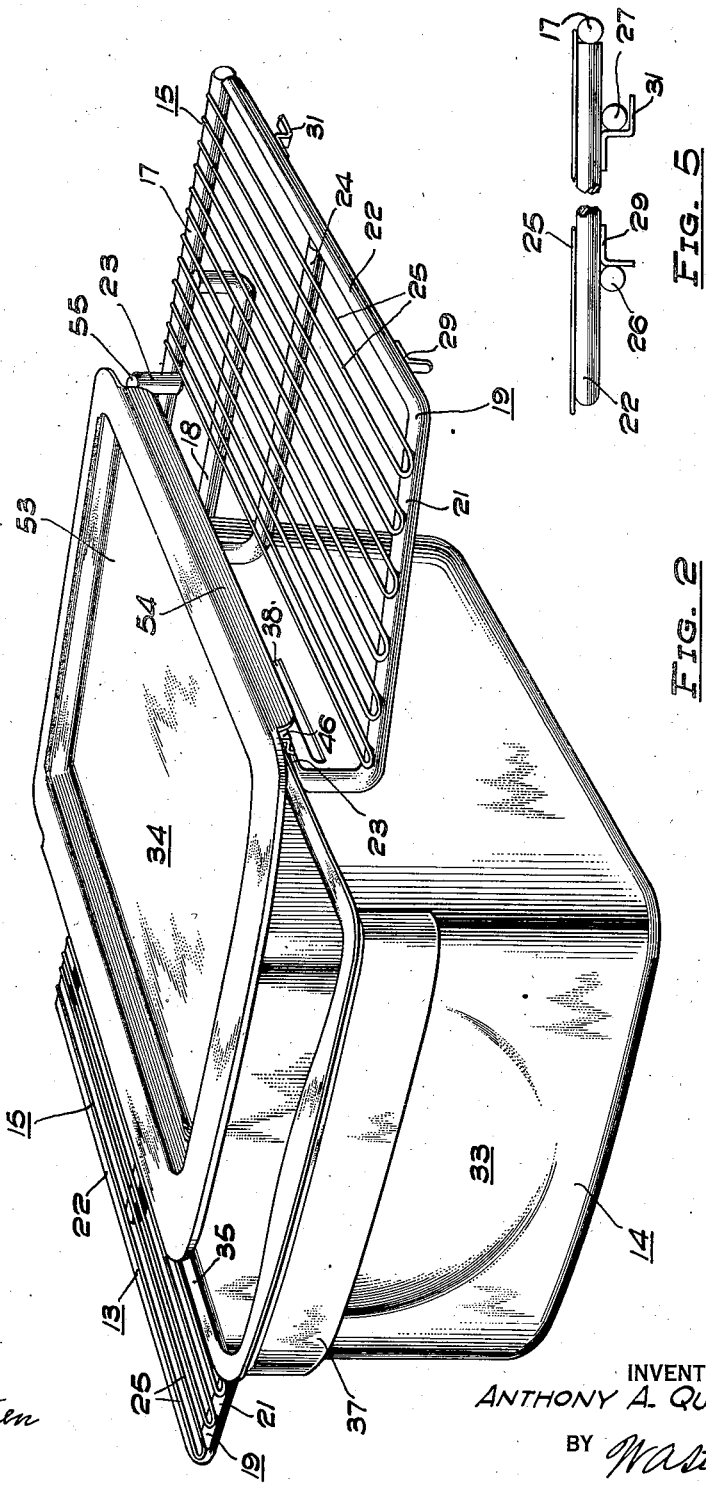
Fig. 2 is an enlarged view in perspective of the partially open food storage receptacle and its supporting structure.
Figure 3:
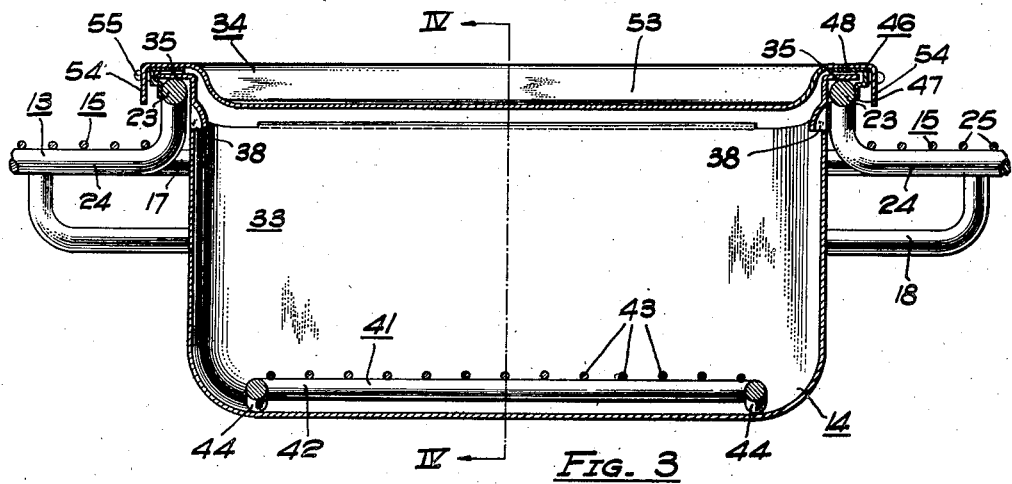
Fig. 3 is a vertical section of the food storage receptacle and its supporting structure taken on the line III—III of Fig. 4.
Figure 4:
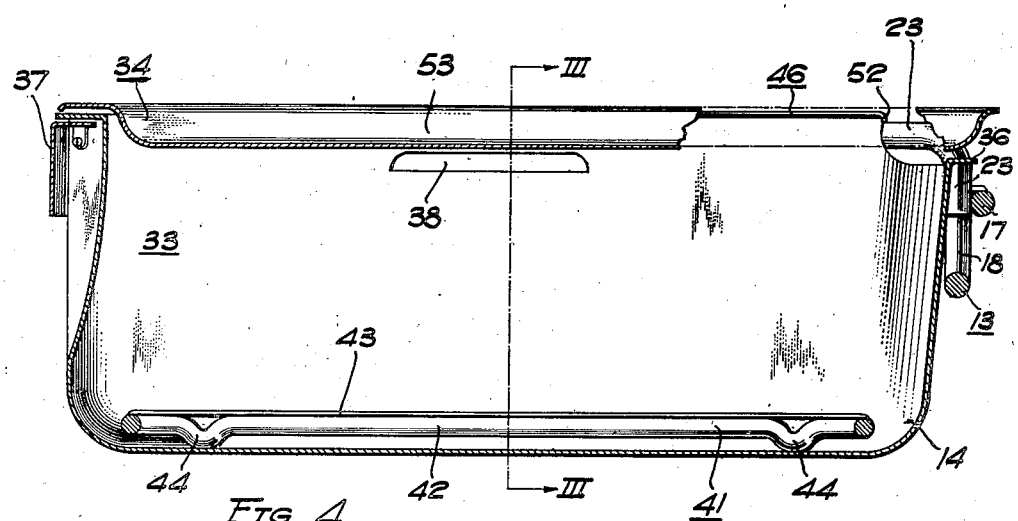
Fig. 4 is a vertical section of the food storage receptacle and its supporting structure taken on the line IV—IV of Fig. 3; and, Fig. 5 is an enlarged view of the supporting structure of the shelf which carries the food storage receptacle of this invention.

As is best seen in Fig. 2, the downwardly-turned side flanges 54 of the cover 34 overlap and conceal the metal strips 46 and the rails 23, protecting them from the accumulation of foreign material which would form a breeding place for germs. The downwardly turned flanges 54 furthermore provide a structure which is readily cleaned with a damp cloth.

It will be apparent from the above that this invention provides a meat storage receptacle which is of simple construction. The invention further provides a supporting structure for the receptacle which is protected by the receptacle from the accumulation of dirt and foreign materials. The receptacle and its supporting structure also provides for increased convenience both in the use of the receptacle and in the storage of tall bottles adjacent the cooling unit.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a refrigerator, the combination of an insulated chamber having an opening therein, a door for said opening, a cooling unit in said chamber, a shelf having an open section disposed directly beneath said cooling unit, a pair of parallel slide rails adjacent said open section and secured to said shelf, a food storage receptacle comprising a pan and a cover therefor, outwardly-turned flanges on said pan, said flanges engaging said rails to suspend said pan therefrom and in close proximity to said cooling unit, means for supporting said cover above but independently of said pan, whereby said pan is adapted to slide on said rails through the opening of said chamber independently of said cover, venting means for said receptacle, and downwardly-turned side flanges on said cover overlapping said rails thereby protecting said rails from contact with foreign matters and presenting a smooth exterior to said receptacle and slide rails.

2. In a refrigerator, the combination of an insulated chamber having an opening therein, a door for said opening, a cooling unit in said chamber, a shelf having an open section extending rearwardly from the front of the shelf and disposed directly beneath said cooling unit, said shelf being spaced from the top of the chamber to provide room for tall bottles, a pair of parallel slide rails adjacent said open section and secured to and above said shelf, a food storage receptacle comprising a pan and a cover therefor, outwardly-turned flanges on said pan, said flanges engaging said rails to suspend said pan therefrom, means for supporting said cover above but independently of said pan, whereby said pan is adapted to slide on said rails through the opening of said chamber independently of said cover, and downwardly-turned side flanges on said cover overlapping said rails thereby protecting said rails from contact with foreign matters and presenting a smooth exterior to said receptacle and slide rails.

3. In a refrigerator, the combination of an insulated chamber having an opening therein, a door for said opening, a cooling unit in the upper portion of said chamber and spaced from at least one side wall thereof, a shelf in said chamber at a level below the bottom of said cooling unit, said shelf having a rectangular open section extending rearwardly from the front edge of said shelf and directly beneath said cooling unit, an open top container having sidewardly-extending flanges adjacent the top thereof, said flanges engaging the edges of said shelf adjacent said rectangular opening to support said container, a pair of rails secured to said shelf above the edges of said shelf adjacent the rectangular opening, and a cover for said container supported on said rails, said container being adapted to slide outwardly and independently of the cover through the door opening of said insulated chamber and said cover being adapted to slide forwardly on its supporting rails for removal from said chamber.

4. In a refrigerator, the combination of an insulated chamber having an opening therein, a door for said opening, a cooling unit in the upper portion of said chamber and spaced from at least one side wall thereof, a shelf in said chamber at a level below the bottom of said cooling unit, said shelf having a rectangular open section directly beneath said cooling unit, a plurality of parallel slide rails adjacent said open section, said slide rails being in groups of two with the members of one group each adjacent one of the opposite edges of said open section and elevated above the level of said shelf and the members of another group each elevated slightly above one of the members of said first-named group, an open top container having sidewardly-extending flanges adjacent the top thereof, said flanges engaging the slide rails of said first-named group to support said container, and a cover for said container resting on the slide rails of the second-named group, said cover having a depressed central portion and downturned flanges on opposite edges, each flange overlapping the rails adjacent thereto, said container having an upper front edge and side edges elevated above the base of said cover and a rear edge at a level below said cover, said container being adapted to slide outwardly through the door opening of said insulated chamber independently of said cover and said cover being adapted to slide forwardly on its rails for removal from said chamber.

ANTHONY A. QUIMPER.